United States Patent
Sayyed et al.

(10) Patent No.: US 12,536,022 B2
(45) Date of Patent: Jan. 27, 2026

(54) PLATFORM STATE INFORMATION IN A HETEROGENEOUS COMPUTING PLATFORM

(71) Applicant: Dell Products L.P., Round Rock, TX (US)

(72) Inventors: Ibrahim Sayyed, Georgetown, TX (US); Adolfo S. Montero, Pflugerville, TX (US); Alan H. Abdelhalim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/626,606

(22) Filed: Apr. 4, 2024

(65) Prior Publication Data

US 2025/0315269 A1 Oct. 9, 2025

(51) Int. Cl.
*G06F 9/44* (2018.01)
*G06F 9/4401* (2018.01)

(52) U.S. Cl.
CPC .................. *G06F 9/4408* (2013.01)

(58) Field of Classification Search
CPC .................................................. G06F 9/4408
See application file for complete search history.

(56) References Cited

U.S. PATENT DOCUMENTS

| | | | | |
|---|---|---|---|---|
| 9,846,584 B1* | 12/2017 | Khoruzhenko | ......... | G06F 21/57 |
| 11,163,871 B2* | 11/2021 | Iyer | ...................... | G06F 9/4406 |
| 11,720,368 B2* | 8/2023 | Myrick | ................ | G06F 9/4401 |
| | | | | 713/2 |
| 2005/0289333 A1* | 12/2005 | Rothman | ............ | G06F 11/3636 |
| | | | | 713/1 |
| 2008/0148037 A1* | 6/2008 | Rothman | .............. | G06F 9/4411 |
| | | | | 713/2 |
| 2011/0320801 A1* | 12/2011 | Nimura | ................ | H04L 9/3226 |
| | | | | 713/2 |
| 2017/0235928 A1* | 8/2017 | Desai | .................... | G06F 21/572 |
| | | | | 713/2 |
| 2019/0354377 A1* | 11/2019 | Tan | ....................... | G06F 3/0238 |

* cited by examiner

*Primary Examiner* — Zahid Choudhury
(74) *Attorney, Agent, or Firm* — Fogarty LLP

(57) ABSTRACT

Systems and methods include an Information Handling System (IHS) that is adapted to provide state information for hardware of the IHS. Upon being powered, a boot sequence of the IHS is initiate. Prior to selection of an OS (Operating System) boot device during the boot sequence, platform state information is collected for IHS hardware that is configured during a respective phase of the boot sequence. A platform state monitor is loaded that publishes the collected platform state information to a shared memory location. Upon selection of an OS boot device during the boot sequence, an OS boot device monitor is loaded that corresponds to the processor architecture of the selected OS boot device, where the loaded OS boot device state monitor collects state information for the selected OS boot device and publishes the collected OS boot device state information to the shared memory location.

20 Claims, 4 Drawing Sheets

PLATFORM STATE INFORMATION IN A HETEROGENEOUS COMPUTING PLATFORM

FIELD

This disclosure relates generally to Information Handling Systems (IHSs), and more specifically, to systems and methods for managing the operation of IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, Information Handling Systems (IHSs) may include: a memory device storing instructions; and one or more processors coupled to the memory device, wherein execution of the stored instructions by the processors causes the IHS to: initiate a boot sequence; prior to selection of an OS (Operating System) boot device during the boot sequence, collect platform state information for IHS hardware configured during a respective phase of the boot sequence; load a platform state monitor that publishes the collected platform state information to a shared memory location; and upon selection of an OS boot device during the boot sequence, load an OS boot device monitor that corresponds to a processor architecture of the selected OS boot device, wherein the loaded OS boot device state monitor collects state information for the selected OS boot device and publishes the collected OS boot device state information to the shared memory location.

In some embodiments, the boot sequence comprises a UEFI (Unified Extensible Firmware Interface) boot sequence. In some embodiments, a computing architecture of the selected OS boot device processors comprises x86 or ARM (Advanced RISC Machine). In some embodiments, the instructions executed by the processors further cause the IHS to map the platform hardware state information stored in the shared memory location by the platform state monitor and the OS boot device state information stored in the shared memory location by the OS boot device state monitor to ACPI (Advanced Configuration and Power Interface) entries. In some embodiments, the OS boot device comprises an SoC (System-on-Chip) of the IHS and wherein the ACPI entries mapped to OS boot device state information comprise an ACPI table specifying state information for hardware settings supported by the SoC. In some embodiments, the hardware settings supported by the SoC comprise hardware registers used to enable a computing function of the SoC. In some embodiments, the platform state monitor collects updates to the platform state information after the OS of the OS boot device is running. In some embodiments, the platform state monitor publishes the collected updates to the platform state information to the shared memory location. In some embodiments, the platform state monitor continues to operate when the OS boot device is reinitialized. In some embodiments, the OS boot device state monitor collects updates to the OS boot device state information after the OS of the OS boot device is running. In some embodiments, the OS boot device state monitor publishes the collected updates to the OS boot device state information to the shared memory location.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
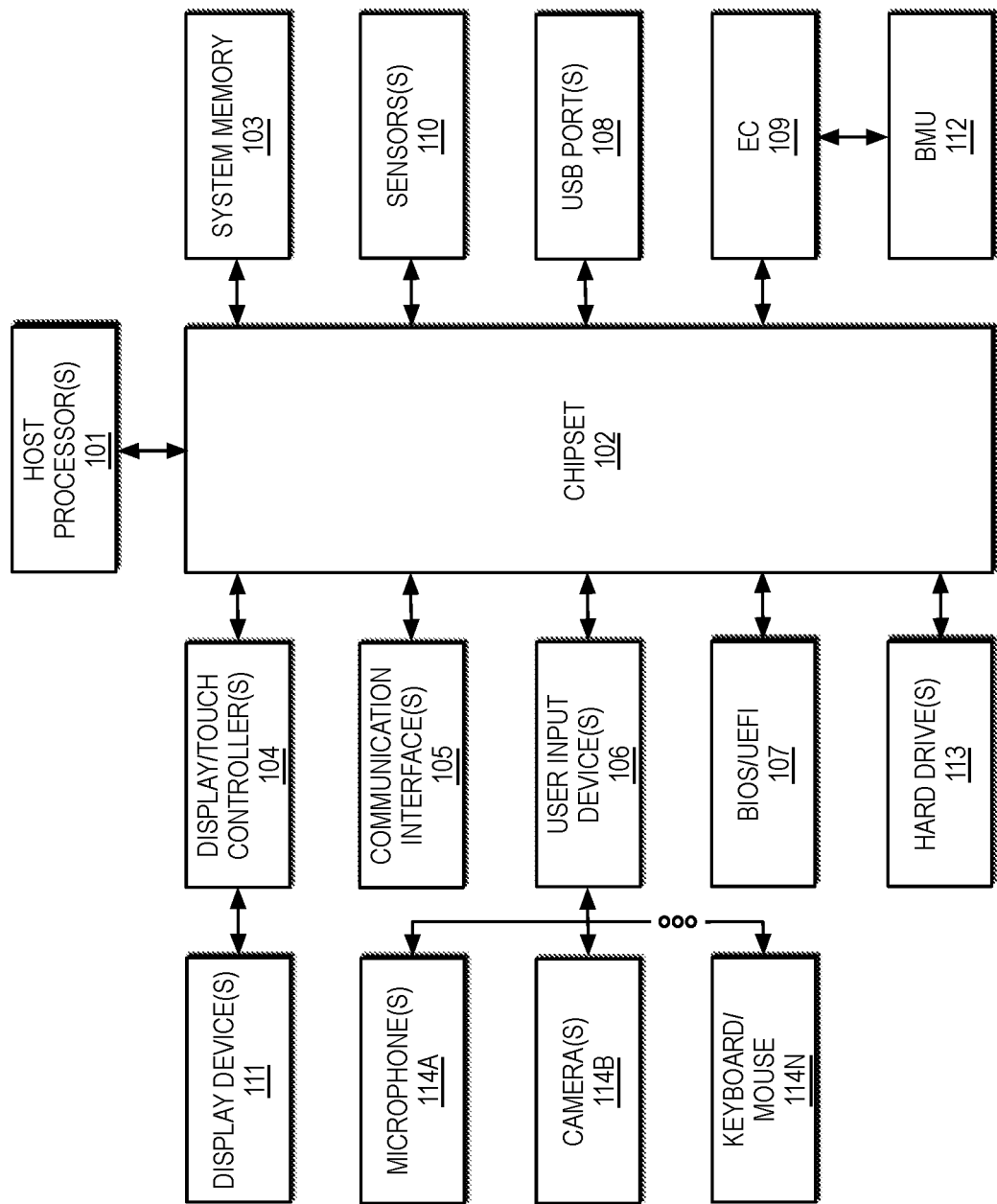
FIG. 1 is a diagram illustrating examples of components of an Information Handling System (IHS) that is configured, according to some embodiments, for providing platform state information describing the IHS.

FIG. 1 is a block diagram of components of an IHS (Information Handling System) 100 that, in some embodiments, may include a heterogenous computing platform, as described in additional detail below, and that is configured to providing platform state information describing the IHS. In particular, IHS 100 may be configured in embodiments to support the collection of state information for hardware components of the IHS. The platform state operations implemented by IHS 100 may be utilized when booting using processors from different computing architectures.

As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, as used herein, the term "BIOS" is intended to also encompass UEFI such that these terms may be used interchangeably. In operation, UEFI 107 provides an abstraction layer that allows the OS to interface with certain hardware components of the IHS 100. Upon booting of IHS 100, host processor(s) 101 may utilize program instructions of UEFI 107 to initialize and test hardware components that are coupled to IHS 100, and to load host OS 312 for use by IHS 100. Via the hardware abstraction layer provided by UEFI, software applications executed by host processor(s) 101 and/or SoCs 200 can interface with certain I/O devices that are coupled to IHS 100.

As described in additional detail below, booting of IHS 100 may be conducted according to boot sequence procedures, such as according to a UEFI boot sequence. In some embodiments, the boot sequence of an IHS 100 may include collection of information describing the state of hardware of the IHS. As these phases of the boot sequence progress, additional hardware is initialized and additional hardware configurations are made. As such, the hardware settings that are included in the current platform state expand as the boot sequence progresses. In embodiments, the initial collection of platform state information may be implemented as part of the boot sequence, where the state information that is collected is particularized at each phase to the hardware that is initialized and/or configured during each respective phase of the boot sequence. In some embodiments, the same procedures may be utilized during runtime, after the IHS has been successfully booted, where the runtime capabilities provide updates to the available hardware state information.

As described in additional detail below, in a heterogenous computing platform 200, a variety of computing architectures may be supported by an IHS. Accordingly, an IHS may be booted utilizing multiple different computing architectures, such as booting to an x86 processors 101, or instead booting to an ARM SoC, such as used to implement a heterogenous computing platform 200. Accordingly, embodiments provide platform state information for different computing architectures, with the platform state information that is collected at each phase particularized to the computing architecture that is being used in operating the IHS. As described in additional detail below, although that IHS state information may be collected separately during phases of the boot sequence prior to and after the selection of an OS boot device, embodiments provide the collected state information to that OS that is booted via a uniform ACPI interface. In this manner, an OS may be provided with low-level platform hardware state information and these state of configurable hardware settings of an OS boot device, such as hardware settings supported by an SoC, without the OS having to account for all of the different hardware interfaces that may be supported by an IHS through the selection of supported OS boot devices.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
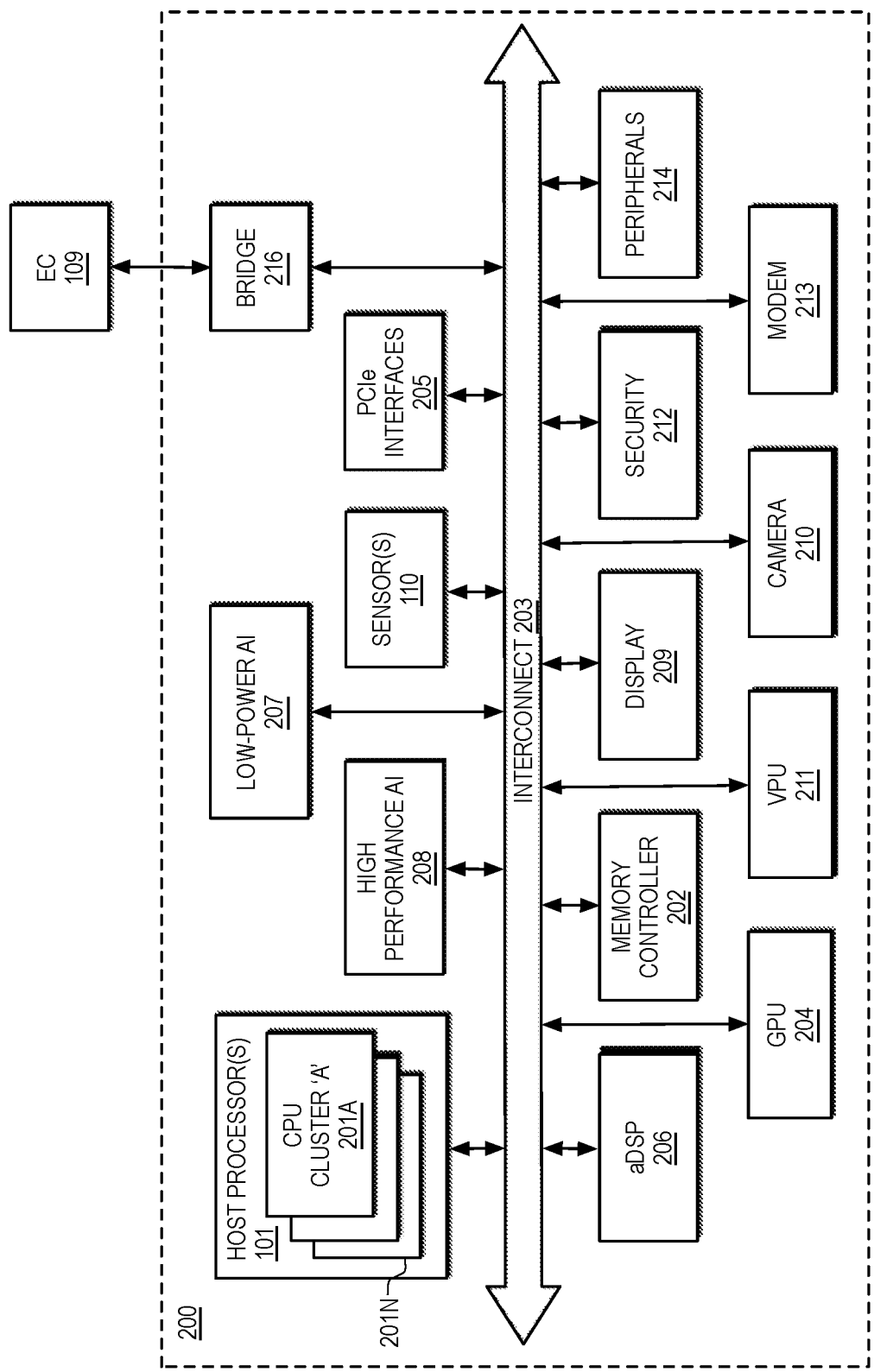
FIG. 2 is a diagram illustrating an example of a heterogenous computing platform configured, according to some embodiments, for providing platform state information by an IHS.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, iOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 configured to provide platform state information of an IHS 100 in which the heterogenous computing platform is installed. In various embodiments, heterogenous computing platform 200 may be implemented in one or more SoCs, FPGAs, ASICs, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In embodiments, IHS hardware state information is collected and made available to various applications that may include host operating system 312 applications, remote management applications and/or heterogenous computing platform 200 applications. This state information that is collected may include hardware state information such as the status of hardware registers used to configure supported settings of a hardware component. For instance, an SoC used to implement a heterogenous computing platform 200 may include a significant number of hardware registers that are used to configure supported functions of the SoC, such as to enable use of a specific security protocol by a network controller implemented by the SoC, or to configure use of a GPU implemented by the SoC for offloading certain calculations. In embodiments, such hardware information may be collected as part of the boot sequence of the IHS and subsequently updated in order to provide applications operating on the IHS with low-level hardware information without having to directly query any of the hardware of the IHS and thus without these applications having to account for all of the different SoC and processor architectures that may be supported by the IHS.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices and may thus operate virtual machines.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 300 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown).

A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100, where configuration of such hardware may be via modifications to UEFI variables corresponding to a respective hardware component.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
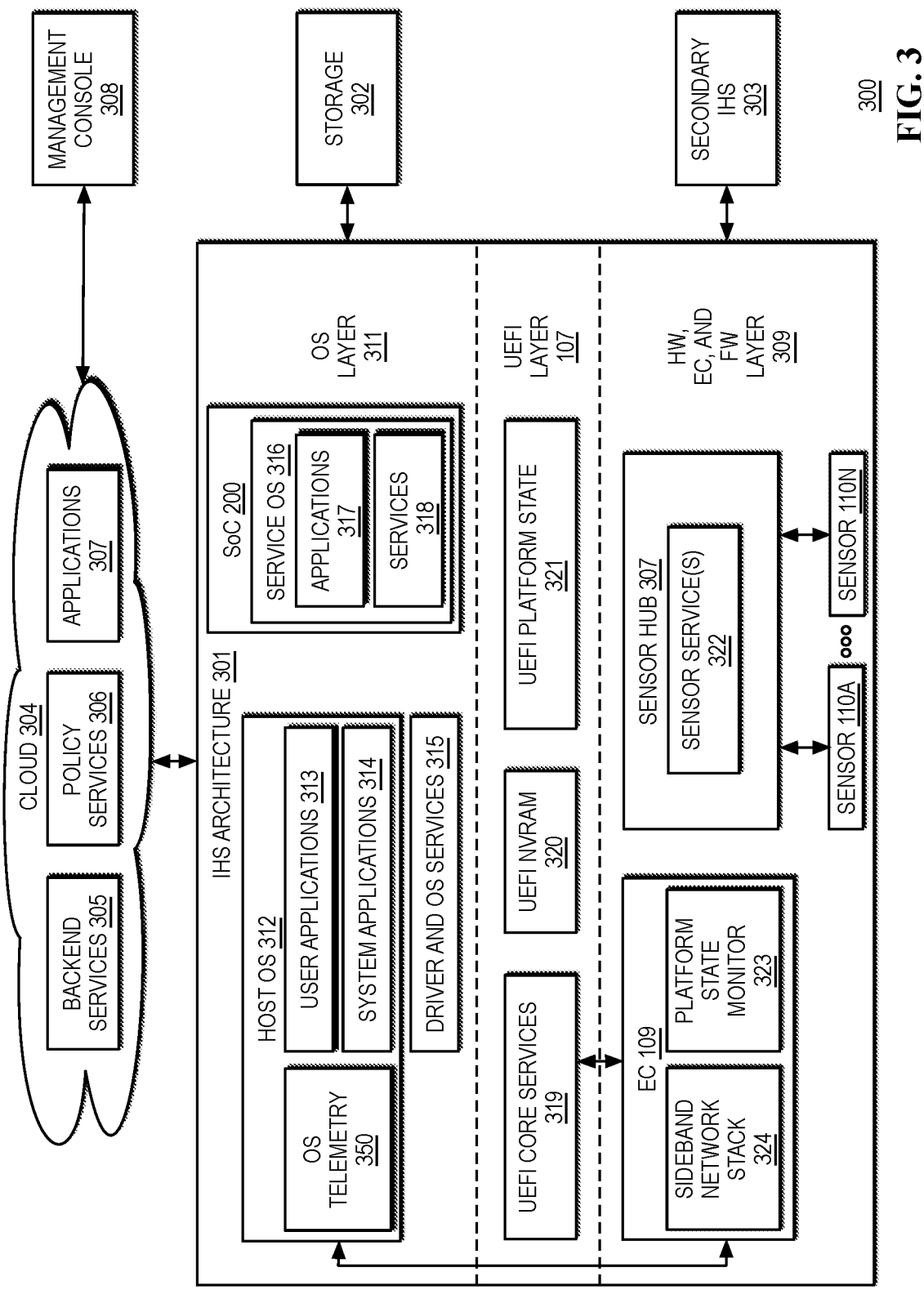
FIG. 3 is a diagram illustrating an example of a system, according to some embodiments, for providing platform state information by an IHS.

FIG. 3 is a diagram illustrating an example of architecture 300 for providing platform state information by an IHS 100 that operates a heterogenous computing platform 200, where the initial platform state may be generated during the different phases of the IHS boot sequence. As illustrated, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308. IHS architecture 301 may include hardware/EC/firmware layer 309, UEFI layer 107, and OS layer 311.

OS layer 311 includes a host OS (Operating System) 312 that is executed by host processor(s) 101. A variety of software applications may operate within the OS 312, where these applications may include user applications 313 and system applications 314, one or more OS telemetry applications 350. OS layer 311 may also include various drivers and other core OS operations, such as the operation of a kernel. As described, various components of a heterogenous computing platform 200 may independently run their own operating systems, such as an OS run by an SoC. Within IHS architecture 301, some of these discrete operating systems operating on individual components of the heterogenous computing platform 200 may be considered service OSs 316, where each service OS may each include its own applications 317 and services 318.

UEFI layer 107 may include UEFI core services 319, UEFI NVRAM 320 and may also include a UEFI network stack. UEFI core services 319 may include operations for identifying and validating the detected hardware components of an IHS. The UEFI network stack may be utilized during initialization of the IHS in support of validation procedures, such as in retrieving reference signatures corresponding to authentic firmware instructions for hardware components of an IHS 100. UEFI core service 319 may also include operations for interfacing with certain hardware of an IHS, in particular user I/O hardware devices 350. As described in additional detail below, UEFI core services 319 may also include instructions for booting IHS 100. In some embodiments, the UEFI core services 319 may also include instructions for phase-specific platform state collection during the UEFI boot process, with separate platform state collection prior to booting of a boot device of the host OS 312 or a service OS 316 that may be operated by an SoC and with state collection processing separately based upon the architecture of the OS boot device that is selected during the boot sequence.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services 323 that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of an IHS. Such shock detection procedures may detect shocks experienced by an IHS 110 and may characterize and assess detected shocks in evaluating possible damage to the IHS.

Figure 4:
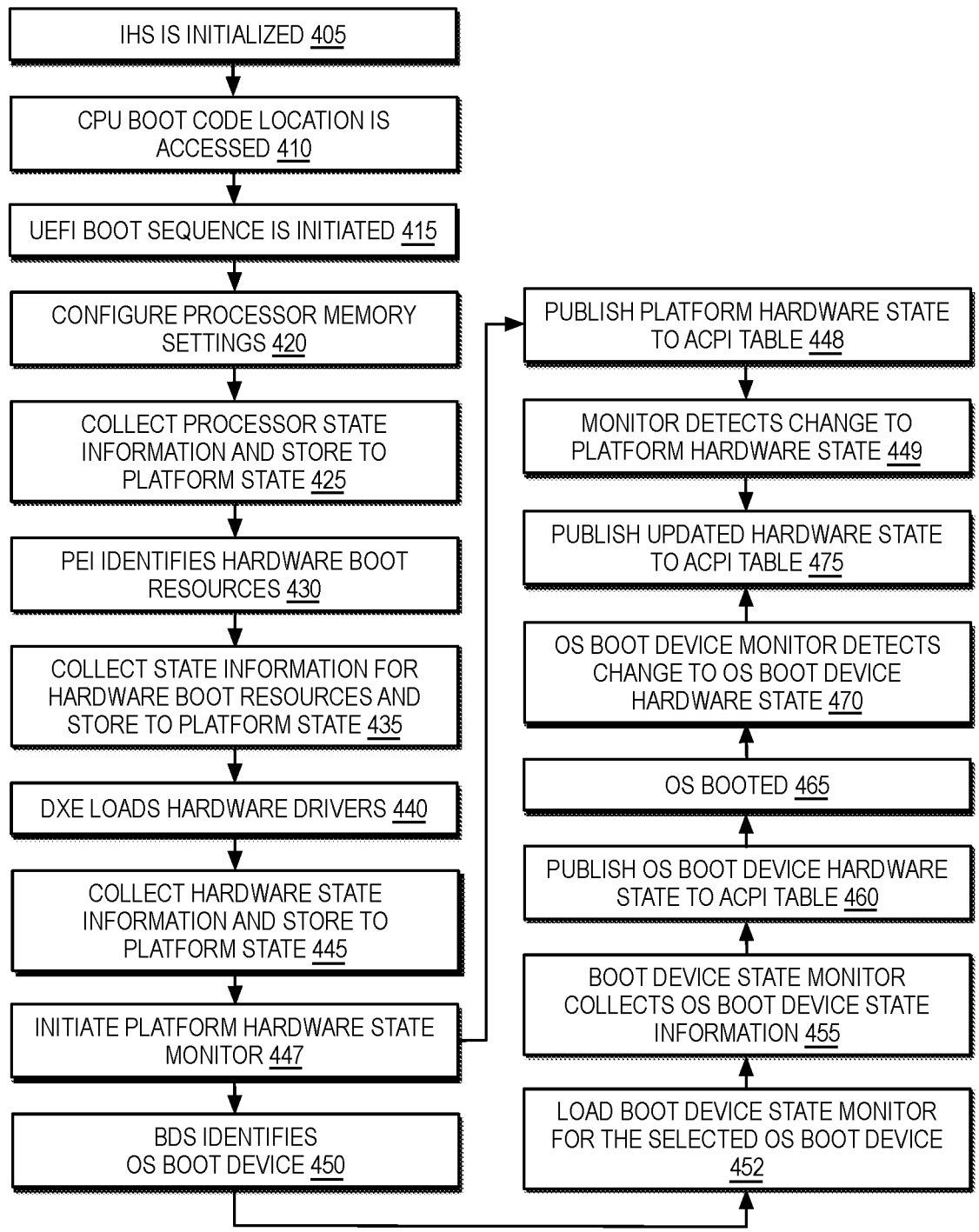
FIG. 4 is a diagram illustrating an example of a method, according to some embodiments, for providing platform state information by an IHS.

FIG. 4 is a diagram illustrating an example of a method, according to some embodiments, for providing state information describing hardware of an IHS, and in particular providing hardware state information that is collected according to the different phases of the IHS boot sequence. Embodiments may implement hardware state collection operations that operate separately prior to selection of an OS boot device during an IHS boot sequence and after selection of the OS boot device, thus accounting for the different computing architectures that may be supported by an OS boot device. In particular, in an initial phase of state collection, platform state information may be collected that describes boot time settings of hardware that is used to reach the point in the boot sequence where the IHS is ready to boot an operating system that will be operated by an OS boot device. Some embodiments may support separate state collection for the selected OS boot device, where the state collection may be selected to account for the computing architecture of the OS boot device, thus providing OS applications with a source of hardware information while the OS applications themselves remain agnostic all of the different computing architectures that may be supported as OS boot devices of an IHS.

In addition, with the platform state information generated separately during the boot sequence, this platform information may be available for configuring the booting of the selected OS boot device, such as an x86 processor, an ARM processor or an SoC. In embodiments, this platform state information may be monitored separately from monitoring of the hardware state of the selected OS boot device. Although the collection of platform information and OS boot device information may be separately monitored and collected, the collected state information may be provided uniformly to the OS, thus providing a single source of information relating the status of hardware settings of the IHS. Embodiments may thus begin, at 405, with the initialization of an IHS 100 that includes a heterogenous computing platform 200. Upon being powered, at 410, secured boot instructions are accessed in order to initialize a host processor 101 and to locate instructions, in some embodiments stored in UEFI NVRAM 320, for initiating a UEFI boot sequence.

The UEFI boot sequence may be described as a series of phases, where successful completion of one phase is generally required for the operation of subsequent phases of the boot sequence. These boot instructions of the initial phase may be used to validate the authenticity of host processor(s) 101, chipset 102, and the motherboard on which the processor is mounted. As described above, a heterogenous computing platform 200 may utilize computing architectures (e.g., ARM) that are different from the that of the main CPU (e.g., x86) 101 of the 100 IHS. In addition, the main CPU 101 may be provided by different manufacturers such that different platform state information is available depending on the manufacturer of the CPU and depending on the computing architecture of the CPU.

In light of the different hardware architectures that may be supported by an IHS 100, different platform state information may be available depending on the architecture of the processor used to boot the IHS. During booting, these differences may vary depending on the phase of the boot sequence. For instance, during the initial phase of the boot sequence (sometimes referred to as the SEC phase), at 420, some processors may support configurations of the use of onboard cache memories of a processor to be used as system memory (i.e., CAR, Cache as RAM) in order to facilitate faster booting of the IHS. Different processors may support different CAR settings, such as the number and size of cache memory banks that are available for use as system memory.

Different processor architectures may offering differing support for various other configurations, such as different security modes and cryptographic settings, during this initial booting phase. During this phase of the boot sequence, different platform state information may be available depending the computing architecture in use. At 425, embodiments collect hardware state information for the architecture of the processor that is being used to boot the IHS, such as hardware registers used to configure CAR settings that are in use. Through such capture of state information for CAR settings, embodiments may collect pre-boot state information that may be used by host OS 312 or remote console 308 diagnostic tools, such as to diagnose repeated memory failure errors during the boot sequence. In some embodiments, the captured state information may be stored to a shared memory location, such as to a dedicated platform state partition of the NVRAM that is used to store the IHS 100 boot code.

Next, at 430, the UEFI boot sequence enters the PEI (Pre-EFI Initialization) phase. During this phase, initialization of authenticated host processor(s) 101, chipset 102 and the motherboard is completed, along with the initialization of system memory 103. As described, CAR operations may utilize processor-specific capabilities for use of cache memory during the boot sequence. Based on operations during the PEI phase, these configurations using processor cache memories may be modified and other processor-specific settings may be enabled, such as settings for use of available system memory 103, and such as setting for use of features supported by the chipset 102. In some embodiments, at 435, UEFI boot code, that may include the UEFI platform state module 321, may query the status of specific hardware registers supported by the processor being booted. In some embodiments, the UEFI boot code may similarly query hardware registers that are supported by the chipset 102 and/or system memory 103 and that may be configured during the PEI phase of the boot sequence. In some embodiments, the captured hardware state information may be stored to a shared memory location, such as to the hardware state partition of the boot code NVRAM.

At 440, execution of UEFI 107 firmware enters the Driver Execution (DXE) phase, where images of bus and core hardware device drivers are retrieved and initialized. Upon entering the DXE phase of the boot sequence, a variety of additional hardware may be initialized. User I/O hardware 106 drivers, such as a keyboard and display, may be activated. Activation of bus drivers may entail initial activation of various hardware of the IHS, and/or additional configuration of hardware setting used by the chipset and/or processors. Accordingly, a variety of different hardware may be configured during the DXE phase, with different processor architectures supporting different hardware configurations. Throughout this phase of the boot sequence, at 445, the UEFI boot code may query the status of specific hardware registers that are configured. For instance, hardware registers for activated storage drives and user I/O hardware may be queried. In addition, hardware registers corresponding to bus settings used by these components and components activated during the DXE phase may be queried. In some embodiments, the captured state information may be stored to a shared memory location, such as to the hardware state partition of the boot code NVRAM.

With core hardware and bus drivers loaded and operating, the boot sequence is ready to enter the BDS (Boot Device Selection) phase for selection of the boot device of the operating system that will be booted. However, in embodiments, prior to selection of the OS boot device, at 447, a platform hardware state monitor is loaded and launched by the UEFI boot code of the IHS. In some embodiments, the platform hardware state monitor operates to detect any changes to any of the hardware settings that have been collected up to this point in the boot sequence and that have been written to the shared memory location, such as to the hardware state partition of the boot code NVRAM.

Upon being launched, at 448, the platform hardware state monitor may map the platform hardware state information that has been collected and stored in the NVRAM 320 to entries in one or more ACPI tables. In some embodiments, a single ACPI table may be generated for platform state information, thereby providing state information for relatively static platform information, such as thermal settings describing the thermal limits on the operation of the IHS in light of the cooling capabilities of the IHS and in light of the IHS being a portable laptop that is handled by a user. Similarly, various power settings may be collected and provided as state information within the one or more ACPI tables that are maintained by the platform hardware state monitor. Such thermal and power information may be relatively static and not expected to change during the runtime operation of an IHS.

However, upon detecting, at 449, any change to these platform hardware settings that are initially collected during the pre-OS boot device selection phases of the IHS boot sequence, at 475, the platform hardware state monitor publishes updates to the ACPI tables that correspond to the hardware setting that has been modified. Operating in this manner, the platform hardware state monitor may continue monitoring for changes to platform hardware settings after the OS boot device has been selected and used in launching an operating system. This monitoring of the platform hardware state may be conducted throughout the operation of the OS and may be conducted throughout intervals where the OS boot device is being restarted, thus providing platform state information for use by local management tools of the IHS and/or by remote management tools 308 in monitoring re-initialization of an OS boot device of an IHS, such as rebooting an SoC that is the OS boot device in order to enable or disable hardware functions supported by the SoC.

As illustrated in FIG. 4, once the platform hardware state monitor has been initiated, embodiments may continue with the boot sequence, in some instances waiting for the platform hardware state monitor to publish the collected platform state to an ACPI table that may be used in booting the OS boot device that has been selected. Once the boot sequence is resumed, execution of UEFI 107 firmware may initiate the BDS (Boot Device Selection) phase of the boot sequence for selection of the OS boot device that will be used in continuing booting of the IHS. In some embodiments a listing of available OS boot devices may be presented as part of the IHS boot sequence. In such instances, the OS boot device may be selected based on a user input. In some embodiments, a default OS boot device may be selected.

At 450, the BDS boot code identifies the OS boot device that has been selected, or that is the default OS boot device. As described, embodiments may support booting of OS boot devices of different computing architectures, such as supporting booting of a host OS 312 operated by an x86 processor and such as support a host OS 312 or service OS 316 operating by an SoC. In this manner, embodiments may support any number of OS boot devices. In providing state information for the selected OS boot device, at 452, embodiments may select and load an OS boot device state monitor that is adapted for collection of state information of the selected OS boot device. For instance, an OS boot device state monitor that is adapted to query and monitor that status of hardware registers used by a particular make of x86 processor (e.g., INTEL, AMD, etc.) may be loaded upon detecting this as the architecture of the selected OS boot device. In scenarios where the selected OS boot device is an SoC, embodiments may select and load an OS boot device state monitor that is adapted to this particular SoC architecture. In this manner, state information may be provided for any number of OS boot devices that are supported, while providing the collected information uniformly to the OS that is booted.

Once the OS boot device has been selected, in some instances, memory and disk space may be allocated for booting of the OS corresponding to the boot code of the selected OS boot device. Once initiated, the OS boot device state monitor may query the status of specific hardware registers that are configured in preparation for booting of the selected OS. For instance, hardware registers for activated storage drives and network hardware may be collected as part of the OS boot device state by the OS boot device state monitor.

In some embodiments, programmable or otherwise configurable hardware of the IHS, such as FPGAs and/or SoCs may be booted as part of booting the OS. In some instances, the operation of these components may be configured through the use of hardware registers. For instance, different programmable functions supported by an FPGA may be configured through the setting of the hardware registers of the FPGA. In a similar manner, operations of an SoC may similarly be configured though hardware register settings, such as enabling an integrated network controller capability of the SoC, or to enable a PCIe interface 205 of the SoC. As part of booting such configurable hardware, the OS boot device state monitor collects these hardware register settings and adds them to a listing of OS boot device state information that is collected in a shared memory location of an NVARM partition, such as the same NVRAM partition used by the platform hardware state monitor.

As with the platform hardware state monitor, at 460, one initiated, the OS boot device state monitor may map the OS boot device state information that has been collected and stored in the NVRAM 320 to entries in one or more ACPI tables. In some embodiments, a dedicated ACPI table may be generated for OS boot device state information. Whereas the platform state information may be relatively static in nature, the hardware settings of the OS boot device may be modified in order to reconfigure the operations of the boot device, such as the described reconfiguration of SoCs and FPGA using modifications to hardware registers supported by these components.

With the OS boot device state information published to ACPI tables, the boot code of the selected OS boot device is loaded and the OS is booted. As described, in some instances, the IHS 100 will boot a host OS 312 that is executed by the main processor of the IHS. In other instances, the IHS may boot to a host OS 312 or service OS 316 that may be operated by an SoC. In such instances, the SoC of may be the selected boot device. Accordingly, at 465, the operating system of the IHS is booted. The operating system and applications running within the operating system may utilize the ACPI tables that have been populated with platform state information and OS boot device state information. For instances, the operating system may query an ACPI SoC table in order to determine the computing functions of the SoC that are currently enabled, thus allowing the OS to adapt its own capabilities in response to the SoC functions that are available, but without the OS having any knowledge of the specific addresses of the hardware registers of the SoC that are used to configure these functions. For example, the operating system by query the ACPI SoC table in order to determine whether a voiceprint authentication function of the SoC has been enabled, thus allowing the operating system to submit user authentication requests to the SoC and to adapt its own authentication functions accordingly. In another illustrative scenario, operating system applications may query an ACPI FPGA table in order to determine the computing functions of the FPGA that have been enabled, thus allowing those applications to offload certain computations to the FPGA.

With the OS booted and operational, at 470, the OS boot device state monitor detects any changes to the OS boot device settings that were collected during the boot sequence and stored to the shared memory location. Upon detecting any modifications to any of these OS boot device settings, at 475, the OS boot device state monitor publishes updates to the ACPI tables that correspond to the one more OS boot device settings that have been detected as modified. Operating in this manner, the OS boot device state monitor may continue monitoring for changes to hardware settings of the OS boot device throughout the operation of the OS.

As described, ACPI tables may be mapped to the shared memory location to which the platform state and OS boot device state information have been stored by the platform hardware state monitor and the OS boot device state monitor. In some embodiments, ACPI tables may be collectively generated and maintained by the platform hardware state monitor and the OS boot device state monitor, with each of the monitors responsible for updating respective hardware state information. In particular, the platform hardware state monitor maintains the entries in the ACPI tables that correspond to hardware settings configured during the pre-OS boot device selection phases of the boot sequence. The OS boot device state monitor maintains entries in these ACPI tables the correspond to OS boot device settings, which are initially configured during booting of the OS, and may be further configured once the OS is running, such as to enable and disable functions of an SoC.

Embodiments provide such IHS hardware state information for use by the OS that is booted, whether a host OS 312 or service OS 316, thus providing a uniform interface for OS applications to access low-level hardware settings of the IHS, without these applications having to directly interface with the different processor architectures that are being configured using these hardware settings, and thus without having to account for the different hardware registers used in configuring boot devices of different architectures. Moreover, embodiments provide separate monitoring of platform-level hardware settings that are not typically modified at runtime and monitoring of OS boot device settings that may be occasionally modified, such as to enable or disable programmed behavior of the boot device. As described, the platform hardware state monitor may continue to operate in scenarios where the OS boot device is restarted, thus allowing certain IHS management operations to continue, such allowing certain management operations to continue while rebooting an SoC that is the OS boot device in order for certain modifications to the SoC to take effect.

In some embodiments, the hardware state information collected by the platform hardware state monitor and the OS boot device state monitor may be combined in ACPI tables that describe that state of IHS systems, such as thermal settings describing the thermal state in which the IHS 100 is currently configured. For instance, hardware registers of the processor used in booting the IHS may specify thermal limits on the processor's operation and which may be collected by the platform hardware state monitor during the initial phases of the boot sequence. Similarly, an SoC selected as the OS boot device may similarly collect the state of hardware registers used to set thermal constraints on the operation of the component. In some embodiments, all such thermal hardware settings that are stored in the NVRAM by either of the monitors may be mapped to a single ACPI thermal table. Similar to thermal constraints, in some embodiments, hardware state information may include power limits on individual hardware components, on hardware subsystems and/or on the IHS itself. In such embodiments, power constraints in the state information stored by either of the monitors may be mapped to a ACPI table that is particular to IHS hardware power settings.

As described, the hardware state of some components may be used to configure the component for different modes of operation. For instance, configuration of a SoC hardware registers may be used to enable different functions of the SoC, or to disable functions of the SoC that would conflict with functionality also supported by other hardware of the IHS 100, such as use of a dedicated network controller of the IHS rather than use of an integrated network controller function that is supported by the SoC. In this same manner, reprogramming of an FPGA to support a different computing function, or to enable or disable a programmed ability of the FPGA, may be initiated through configuration of hardware registers of the FPGA. In some embodiments, the collected state information for such programmable components may be mapped to a dedicated ACPI table, such as an FPGA table or an SoC table. In providing hardware state information in this manner, embodiments provide adapted ACPI capabilities that allow existing OS applications to retrieve and utilize low-level hardware state information, without these OS applications having to account for the different hardware architectures that may be supported by the IHS.

Throughout the ongoing operation of the IHS, both the platform hardware state monitor and the OS boot device state monitor may continue monitoring for changes to hardware settings that were collected during the boot sequence. Upon detecting any such modifications, at 475, the monitor that detected the changes may update the state information stored in the NVRAM such that the ACPI table provides the updated state for the component in response to subsequent queries. In this manner, embodiments may continually monitor and collect the hardware state information that is collected during the boot sequence.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a memory device storing instructions; and
one or more processors coupled to the memory device, wherein execution of the stored instructions by the processors causes the IHS to:
initiate a boot sequence;
prior to selection of an OS (Operating System) boot device during the boot sequence, collect platform state information for IHS hardware configured during a respective phase of the boot sequence;
load a platform state monitor that publishes the collected platform state information to a shared memory location; and
upon selection of an OS boot device during the boot sequence, load an OS boot device monitor that corresponds to a processor architecture of the selected OS boot device, wherein the loaded OS boot device state monitor collects state information for the selected OS boot device and publishes the collected OS boot device state information to the shared memory location.

2. The IHS of claim 1, wherein the boot sequence comprises a UEFI (Unified Extensible Firmware Interface) boot sequence.

3. The IHS of claim 1, wherein a computing architecture of the selected OS boot device processors comprises x86 or ARM (Advanced RISC Machine).

4. The IHS of claim 1, wherein the instructions executed by the processors further cause the IHS to map the platform hardware state information stored in the shared memory location by the platform state monitor and the OS boot device state information stored in the shared memory location by the OS boot device state monitor to ACPI (Advanced Configuration and Power Interface) entries.

5. The IHS of claim 4, wherein the OS boot device comprises an SoC (System-on-Chip) of the IHS and wherein the ACPI entries mapped to OS boot device state information comprise an ACPI table specifying state information for hardware settings supported by the SoC.

6. The IHS of claim 5, wherein the hardware settings supported by the SoC comprise hardware registers used to enable a computing function of the SoC.

7. The IHS of claim 1, wherein the platform state monitor collects updates to the platform state information after the OS of the OS boot device is running.

8. The IHS of claim 7, wherein the platform state monitor publishes the collected updates to the platform state information to the shared memory location.

9. The IHS of claim 7, wherein the platform state monitor continues to operate when the OS boot device is reinitialized.

10. The IHS of claim 1, wherein the OS boot device state monitor collects updates to the OS boot device state information after the OS of the OS boot device is running.

11. The IHS of claim 10, wherein the OS boot device state monitor publishes the collected updates to the OS boot device state information to the shared memory location.

12. A method for operating an Information Handling System (IHS), the method comprising:
initiating a boot sequence;
prior to selection of an OS (Operating System) boot device during the boot sequence, collecting platform state information for IHS hardware configured during a respective phase of the boot sequence;

loading a platform state monitor that publishes the collected platform state information to a shared memory location; and upon selection of an OS boot device during the boot sequence, loading an OS boot device monitor that corresponds to a processor architecture of the selected OS boot device, wherein the loaded OS boot device state monitor collects state information for the selected OS boot device and publishes the collected OS boot device state information to the shared memory location.

13. The method of claim 12, wherein a computing architecture of the selected OS boot device processors comprises x86 or ARM (Advanced RISC Machine).

14. The method of claim 12, wherein the instructions executed by the processors further cause the IHS to map the platform hardware state information stored in the shared memory location by the platform state monitor and the OS boot device state information stored in the shared memory location by the OS boot device state monitor to ACPI (Advanced Configuration and Power Interface) entries.

15. The method of claim 12, wherein the platform state monitor collects updates to the platform state information after the OS of the OS boot device is running and publishes the collected updates to the platform state information to the shared memory location.

16. The method of claim 12, wherein the OS boot device state monitor collects updates to the OS boot device state information after the OS of the OS boot device is running and publishes the collected updates to the OS boot device state information to the shared memory location.

17. An NVRAM (Non-Volatile Random-Access Memory) storage device having instructions stored thereon, wherein execution of the instructions by one or more processors of an IHS (Information Handling System) causes the processor to:

initiate a boot sequence;

prior to selection of an OS (Operating System) boot device during the boot sequence, collect platform state information for IHS hardware configured during a respective phase of the boot sequence;

load a platform state monitor that publishes the collected platform state information to a shared memory location; and upon selection of an OS boot device during the boot sequence, load an OS boot device monitor that corresponds to a processor architecture of the selected OS boot device, wherein the loaded OS boot device state monitor collects state information for the selected OS boot device and publishes the collected OS boot device state information to the shared memory location.

18. The NVRAM storage device of claim 17, wherein a computing architecture of the selected OS boot device processors comprises x86 or ARM (Advanced RISC Machine).

19. The NVRAM storage device of claim 17, wherein the instructions executed by the processors further cause the IHS to map the platform hardware state information stored in the shared memory location by the platform state monitor and the OS boot device state information stored in the shared memory location by the OS boot device state monitor to ACPI (Advanced Configuration and Power Interface) entries.

20. The NVRAM storage device of claim 17, wherein the platform state monitor collects updates to the platform state information after the OS of the OS boot device is running and publishes the collected updates to the platform state information to the shared memory location.

* * * * *